(12) United States Patent
Ohmori et al.

(10) Patent No.: US 6,422,006 B2
(45) Date of Patent: Jul. 23, 2002

(54) EXHAUST GAS PURIFYING APPARATUS FOR INTERNAL COMBUSTION ENGINE

(75) Inventors: Kenichi Ohmori; Shusuke Akazaki; Norihito Watanabe; Kei Machida, all of Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/835,414

(22) Filed: Apr. 17, 2001

(30) Foreign Application Priority Data

Jun. 27, 2000 (JP) ........................................ 2000-193518

(51) Int. Cl.[7] ................................................. F01N 3/00
(52) U.S. Cl. ............................. 60/297; 60/288; 60/291
(58) Field of Search ........................... 60/288, 291, 297, 60/278

(56) References Cited

U.S. PATENT DOCUMENTS

| | | | | |
|---|---|---|---|---|
| 5,233,830 A | * | 8/1993 | Takeshima et al. | 60/288 |
| 5,315,824 A | * | 5/1994 | Takeshima | 60/297 |
| 5,365,733 A | * | 11/1994 | Takeshima et al. | 60/288 |
| 5,746,052 A | * | 5/1998 | Kinugasa et al. | 60/288 |
| 5,765,369 A | * | 6/1998 | Tanaka et al. | 60/297 |
| 5,934,069 A | * | 8/1999 | Hertl et al. | 60/297 |
| 5,946,906 A | * | 9/1999 | Akazaki et al. | 60/297 |
| 6,012,284 A | * | 1/2000 | Tanaka et al. | 60/297 |
| 6,112,520 A | * | 9/2000 | Kaiho et al. | 60/297 |
| 6,334,304 B1 | * | 1/2002 | Machida et al. | 60/297 |

\* cited by examiner

*Primary Examiner*—Thomas Denion
*Assistant Examiner*—Diem Tran
(74) *Attorney, Agent, or Firm*—Arent Fox Kintner Plotkin & Kahn, PLLC (57) ABSTRACT

An exhaust gas purifying apparatus for an internal combustion engine is provided for simultaneously realizing sufficient recovery of the adsorbing capability of an adsorbent and limitation to an increase in exhaust resistance. The exhaust gas purifying apparatus for an internal combustion engine comprises a flow path switching valve for switching an exhaust gas flow path to a bypass exhaust passage or to a main exhaust passage, three-way catalysts, and an HC adsorbent arranged in the bypass exhaust passage for adsorbing hydrocarbons in exhaust gases and fully desorbing the adsorbed hydrocarbons when it is heated to a full desorption temperature or higher. A troidal passage of the main exhaust passage completely surrounds a portion of the bypass exhaust passage in which the HC adsorbent is arranged. A ratio S1/S2 of the cross-sectional area S2 of the troidal passage to the cross-sectional area of a flow-in passage is set in a range from 1.0 at which the exhaust resistance begins gradually decreasing as the ratio S2/S1 increases to 3.0 at which the HC adsorbent can be heated to the full desorption temperature or higher.

2 Claims, 9 Drawing Sheets

EXHAUST GAS PURIFYING APPARATUS FOR INTERNAL COMBUSTION ENGINE

BACKGROUND OF THE INVENTION

1. Field of the Invention

The present invention relates to an exhaust gas purifying apparatus for an internal combustion engine which comprises a catalyst for purifying exhaust gases, and an adsorbent for temporarily adsorbing unburnt components in the exhaust gases and desorbing the once adsorbed unburnt components in an exhaust system.

2. Description of the Prior Art

A conventional exhaust gas purifying apparatus of the type mentioned above is known, for example, in Laid-open Japanese Patent Application No. 7-332074. The exhaust gas purifying apparatus described in this document comprises a catalyzer arranged in an exhaust pipe of an engine, and a hydrocarbon (HC) adsorbent arranged at a location downstream of the catalyzer in the exhaust pipe. The exhaust pipe has a main exhaust passage, and a bypass exhaust passage which is branched off the main exhaust passage at a location downstream of the catalyzer and joined again to the main exhaust passage at a location downstream of the branched location. In one implementation of this exhaust gas purifying apparatus, the main exhaust passage comprises a troidal passage portion which extends to completely surround the bypass exhaust passage. The troidal passage portion has a cross-section area substantially larger than that of the bypass exhaust passage. At an intermediate portion in the bypass exhaust passage, an HC adsorbent is arranged. This HC adsorbent is comprised of a honeycomb core, extending across the cross section of the bypass exhaust passage, which has a multiplicity of inner holes extending through the honeycomb core in the same direction along the bypass exhaust passage, and an HC adsorbent layer formed on the surfaces of the walls of the inner holes for adsorbing hydrocarbons. A flow path switching valve is arranged at the joint at which the bypass exhaust passage joins to the main exhaust passage. The flow path switching valve opens one of the main exhaust passage and the bypass exhaust passage while closing the other, thereby switching a flow pass of the exhaust gases from the catalyzer to the main exhaust passage or the bypass exhaust passage.

In the exhaust gas purifying apparatus described above, the flow path switching valve switches the exhaust gas flow path to the bypass exhaust passages at the time the engine is started, causing exhaust gases immediately after the starting of the engine to pass through the catalyzer and then pass through the HC adsorbent. In this event, hydrocarbons included in the exhaust gases immediately after the starting cannot be purified by the catalyzer, since it has not been activated due to a low temperature immediately after the starting, and therefore are adsorbed by the HC adsorbent when they pass therethrough. Subsequently, as the catalyzer is heated by the heat of the exhaust gases after the starting of the engine and eventually activated, the catalyzer starts purifying hydrocarbons in the exhaust gases, and the exhaust gas flow path is switched to the main exhaust passage by the flow path switching valve. This causes the exhaust gases to flow within the troidal passage along the outer peripheral surface of the HC adsorbent, so that the HC adsorbent is heated by heat exchange with the exhaust gases to desorb the adsorbed hydrocarbons. The desorbed hydrocarbons are recirculated to the catalyzer for purification.

In the conventional exhaust gas purifying apparatus described above, since the troidal passage of the main exhaust passage has a cross-sectional area significantly larger than that of the bypass exhaust passage, the heat of exhaust gases passing within the troidal passage is susceptible to dissipation from the troidal passage to the outside because the outer peripheral surface of the troidal passage has the area substantially larger than that of the outer peripheral surface of the bypass exhaust passage, when the exhaust gas flow path is connected to the main exhaust passage. This results in an inefficient heat exchange between the exhaust gases and the HC adsorbent, thereby preventing the HC adsorbent from being heated to a temperature sufficiently high to desorb hydrocarbons. Thus, the hydrocarbons remains in the HC adsorbent which can fail to recover its adsorbing capability. As a result, a smaller amount of hydrocarbons in the exhaust gases will be adsorbed by the HC adsorbent after the internal combustion engine is started next time, causing a degraded exhaust gas emission characteristic. Particularly, if hydrocarbons repeatedly remains in the HC adsorbent in this way, the accumulated hydrocarbons will gradually degrade the adsorbing capability of the HC adsorbent to prominently worsen the exhaust gas emission characteristic. While this problem may be solved by reducing the cross-sectional area of the troidal passage, such a reduction would result in an increased exhaust resistance in the troidal passage.

OBJECT AND SUMMARY OF THE INVENTION

The present invention has been made to solve the problems as mentioned above, and its object is to provide an exhaust gas purifying apparatus for an internal combustion engine which is capable of simultaneously realizing sufficient recovery of the adsorbing capability of an adsorbent and a limitation to an increased exhaust resistance.

To achieve the above object, the present invention provides an exhaust gas purifying apparatus for an internal combustion engine, which is arranged in an exhaust system having a first exhaust passage connected to the internal combustion engine and a second exhaust passage having one end branched off the first exhaust passage and the other end joined to the first exhaust passage for purifying exhaust gases discharged from the internal combustion engine. The exhaust gas purifying apparatus includes switching means for switching an exhaust gas flow path to one of the second exhaust passage and the first exhaust passage in accordance with an operating state of the internal combustion engine; a catalyst for purifying exhaust gases in the exhaust system; and an adsorbent arranged in the second exhaust passage for adsorbing unburnt components in the exhaust gases supplied to the second exhaust passage through the switching means, and for desorbing the adsorbed unburnt components when the adsorbent is heated to a predetermined temperature or higher. The second exhaust passage is arranged in the first exhaust passage which includes a troidal passage which completely surrounds a portion of the second exhaust passage in which the adsorbent is arranged. With the exhaust gas flow path switched to the first exhaust passage by the switching means, a ratio of a cross-sectional area of the troidal passage to a cross-sectional area of a passage at a predetermined location of the exhaust system except for the troidal passage is set to a value in a range from a first predetermined value at which an exhaust resistance starts gradually decreasing as the ratio becomes higher to a second predetermined value at which the temperature of the adsorbent can rise to the predetermined temperature or higher.

According to the exhaust gas purifying apparatus for an internal combustion engine, the switching means switches the exhaust gas flow path to the first exhaust passage or to the second exhaust passage in accordance with an operating state of the internal combustion engine. By the action of the switching means, when the catalyst is not yet activated immediately after the internal combustion engine is started, the exhaust gas flow path is switched to the second exhaust passage such that unburnt components in the exhaust gases are adsorbed by the adsorbent in the second exhaust passage.

Also, when the exhaust gas flow path is switched to the first exhaust passage in synchronism with the activation of the catalyst after starting the internal combustion engine, the troidal passage of the first exhaust passage, which completely surrounds the portion of the second exhaust passage in which the adsorbent is arranged, acts to provide heat exchange between the exhaust gases flowing through the troidal passage and the adsorbent. In this event, generally, as the cross-sectional area of the troidal passage is smaller, the area ratio of the outer peripheral surface of the troidal passage to the outer peripheral surface of the second exhaust passage is smaller, so that the heat of the exhaust gases is less susceptible to dissipation to the outside of the troidal passage, and the exhaust gases are in contact with the outer peripheral surface of the second exhaust passage in a larger proportion, resulting in a tendency of an increased efficiency of the heat exchange between the exhaust gases flowing through the troidal passage and the adsorbent. Stated another way, as the ratio of the cross-sectional area of the troidal passage to the cross-sectional area at a predetermined location except for the troidal passage is lower, the adsorbent can reach a higher temperature due to the heat exchange with the exhaust gases. Thus, unburnt components adsorbed by the adsorbent can be desorbed by setting the ratio to a value equal to or less than a second predetermined value at which the temperature of the adsorbent is promptly increased to a full desorption temperature to desorb the adsorbed unburnt components, when the exhaust gas flow path has been switched to the first exhaust passage, with the result that the adsorbing capability of the adsorbent can be sufficiently recovered.

Also, since the exhaust resistance in an exhaust passage is generally smaller as the cross-sectional area of the exhaust passage is larger, the exhaust resistance tends to be smaller as the ratio of the cross-sectional area of the troidal passage to the cross-sectional area at a predetermined location of the first exhaust passage except for the troidal passage is larger. It is therefore possible to limit an increase in the exhaust resistance in the troidal passage by setting the ratio to a value equal to or more than a first predetermined value at which the exhaust resistance begins gradually decreasing as the ratio increases. In this way, according to the present invention, it is possible to simultaneously realize the sufficient recovery of the adsorbing capability of the adsorbent and limitation to an increase in the exhaust resistance by setting the ratio to a value in a range from the first predetermined value to the second predetermined value.

Preferably, in the exhaust gas purifying apparatus for an internal combustion engine, the predetermined location of the exhaust system is downstream of a portion from which the second exhaust passage is branched off the first exhaust passage and upstream of the troidal passage, the first predetermined value is set to 1.0, and the second predetermined value is set to 3.0.

When the predetermined location is selected to be downstream of a location from which the second exhaust passage is branched off the first exhaust passage and upstream of the troidal passage, i.e., at a location at which a flow path area is generally reduced to a minimum, it has been confirmed from experiments made by the Applicant that the first predetermined value is 1.0 and the second predetermined value is 3.0. With these settings, it is possible to simultaneously realize the sufficient recovery of the adsorbing capability of the adsorbent and limitation to an increase in the exhaust resistance.

DETAILED DESCRIPTION OF THE EMBODIMENT

Figure 1:
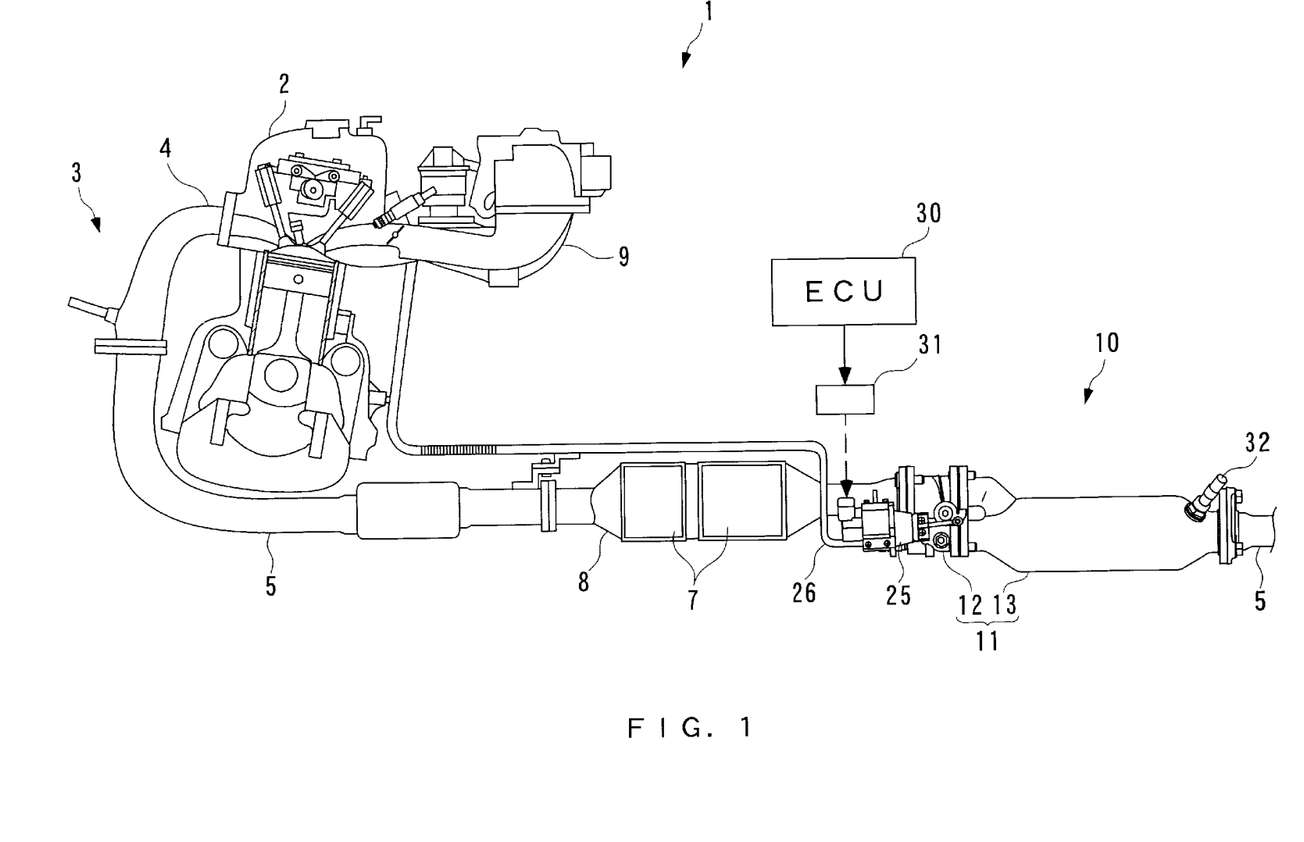
FIG. 1 is a diagram generally illustrating an internal combustion engine which is equipped with an exhaust gas purifying apparatus according to one embodiment of the present invention.

In the following, an exhaust gas purifying apparatus for an internal combustion engine according to one embodiment of the present invention will be described in detail with reference to the accompanying drawings. FIG. 1 illustrates an internal combustion engine in which the exhaust gas purifying apparatus of this embodiment is applied. The illustrated exhaust gas purifying apparatus 1 is arranged in an exhaust system 3 of an internal combustion engine 2 (hereinafter simply referred to the "engine 2") to emit exhaust gases emitted from the engine 2 to the atmosphere while purifying the same and to recirculate a portion of the exhaust gases to the engine 2 (EGR).

An exhaust pipe 5 is connected to the engine 2 through an exhaust manifold 4. At intermediate locations in the exhaust pipe 5, there are provided, in order from the upstream side, a catalyzer having two three-way catalysts 7 for purifying exhaust gases, and an HC adsorber 10 for adsorbing and processing hydrocarbons. The two three-way catalysts 7 are arranged adjacent to each other along the exhaust pipe 5. The three-way catalysts 7, when activated, purify harmful substances (hydrocarbons, carbon monoxide and nitrogen compounds) in exhaust gases passing through the catalyzer 8 by oxidation-reduction catalyst actions. The three-way catalysts 7 begins activating at a predetermined activation starting temperature (for example, at 100° C.) or higher, and is fully activated when it reaches a full activation temperature (for example, 300° C.) higher than the activation starting temperature.

The HC adsorbent 10, in turn, adsorbs hydrocarbons in exhaust gases until a predetermined time period t1 is elapsed after starting the engine 2 (for example, about 40 seconds immediately after the starting), at which time the respective three-way catalysts 7 reach the activation starting temperature, thereby preventing hydrocarbons in the exhaust gases from being emitted in the atmosphere.

Figure 2:
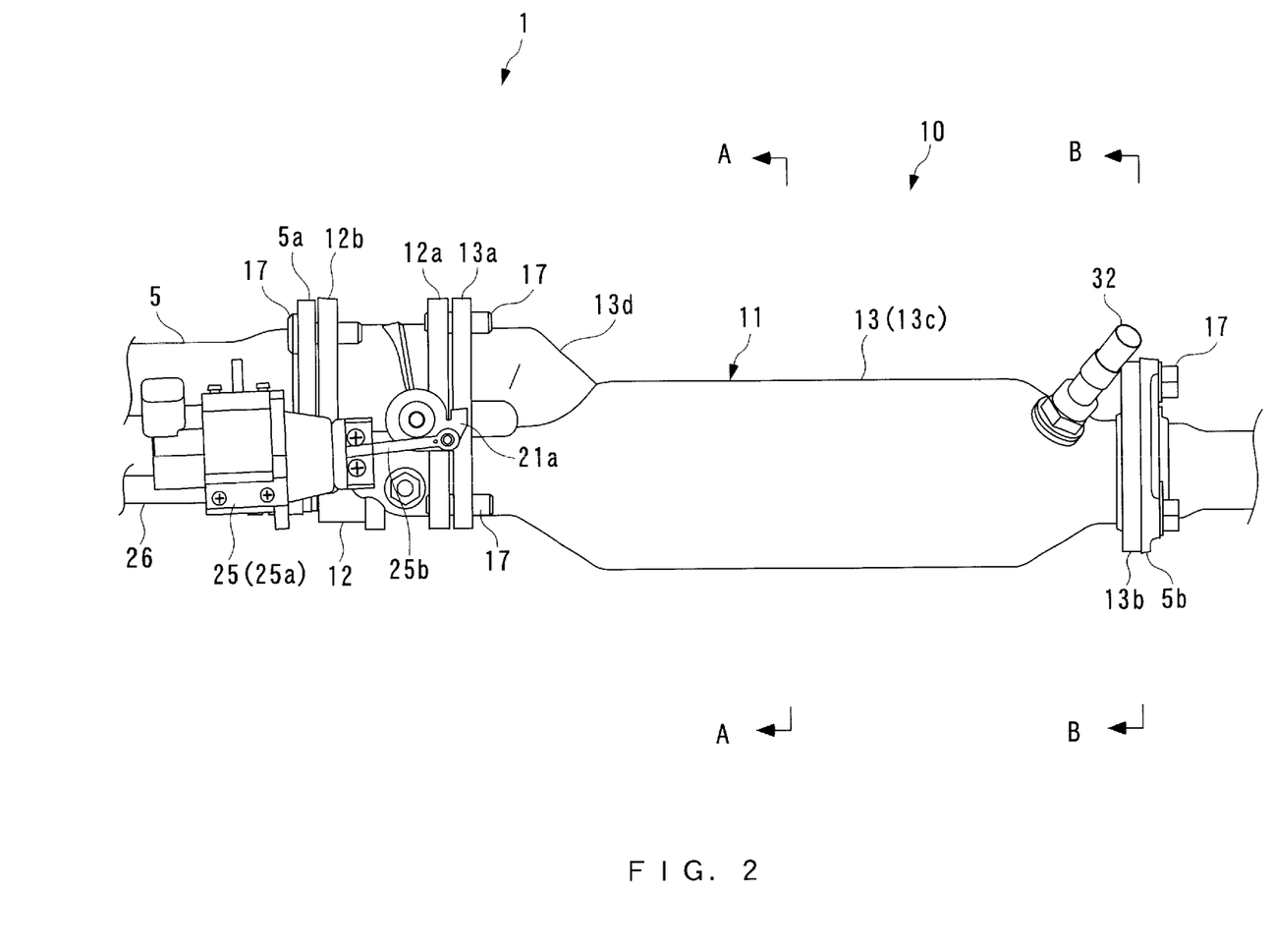
FIG. 2 is a side view generally illustrating the structure of the exhaust gas purifying apparatus.
Figure 3:
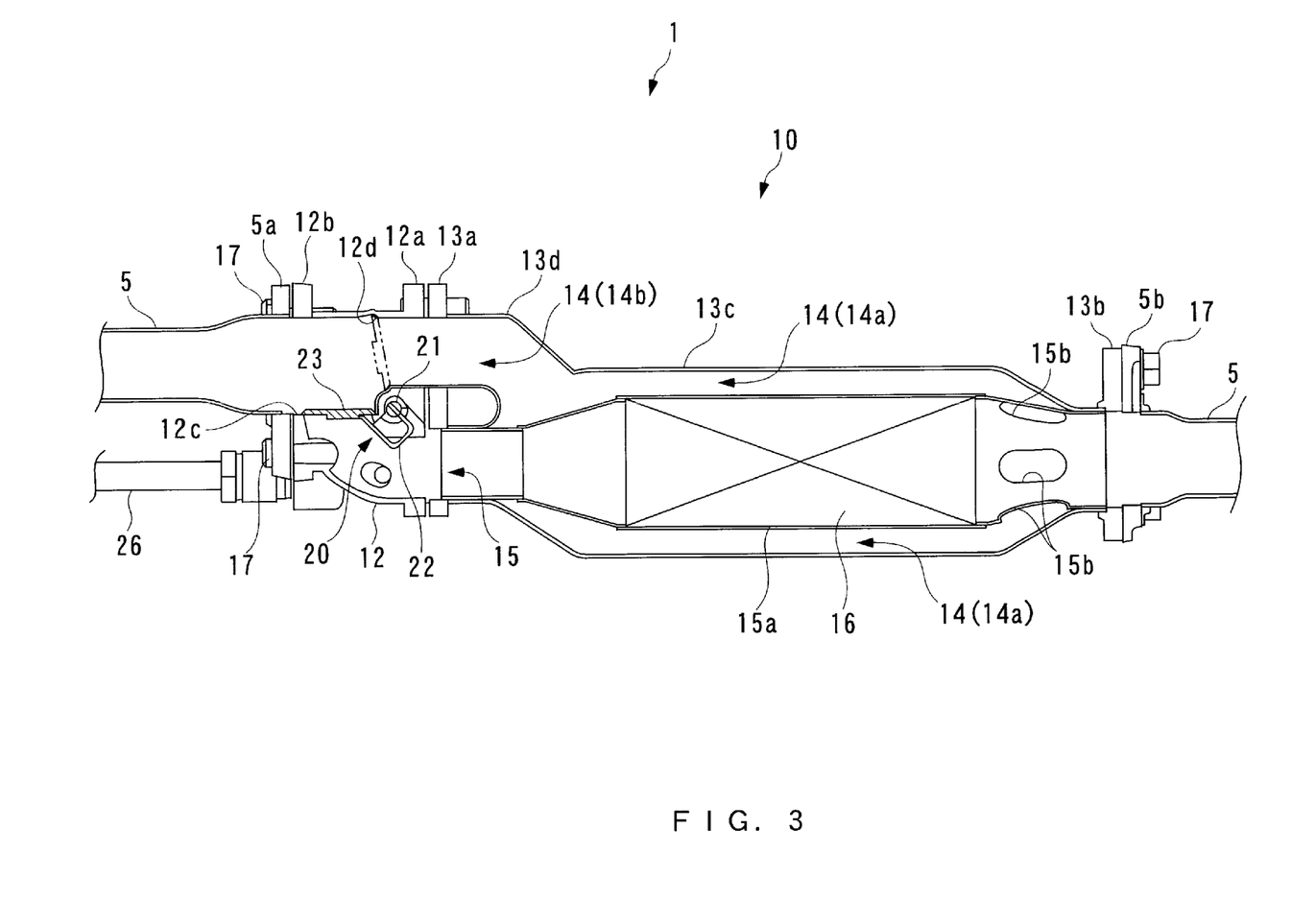
FIG. 3 is a cross-sectional view of FIG. 2.

As illustrated in FIGS. 2 and 3, the HC adsorbent 10 comprises an elongated case 11; a main exhaust passage 14, as a first exhaust passage, extending through the case 11; a bypass exhaust passage 15, as a second exhaust passage, formed in the case 11 and branched off the main exhaust passage 14 and subsequently joined thereto; an HC adsorbent 16 arranged in the bypass exhaust passage 15; and a flow path switching valve 20 (switching means) for switching a flow path of exhaust gases flowing in the HC adsorbent 10 to one of the main exhaust passage 14 and the bypass exhaust passage 15.

The case 11 is composed of a branch case 12 and a junction case 13 arranged in combination at a location downstream of the branch case 12, which are integrally assembled into the case 11. The branch case 12 and junction case 13 are both made of a metal (for example, stainless steel). These branch case 12 and junction case 13 are provided with flanges 12a, 13a, respectively, formed on their end faces adjacent to each other. These flanges 12a, 13a are fixed by three bolts 17 to connect the branch case 12 to the junction case 13. Likewise, the branch case 12 is connected to the upstream exhaust pipe 5 through flanges 12b, 5a formed on their end faces adjacent to each other with three bolts 17, while the junction case 13 is connected to the downstream exhaust pipe 5 through flanges 13b, 5b formed on their end faces adjacent to each other with three bolts 17.

The main exhaust passage 14 extends through the branch case 12, and an upstream end of the bypass exhaust passage 15 is branched off an upstream end of the main exhaust passage 14 in the branch case 12.

Figure 7:
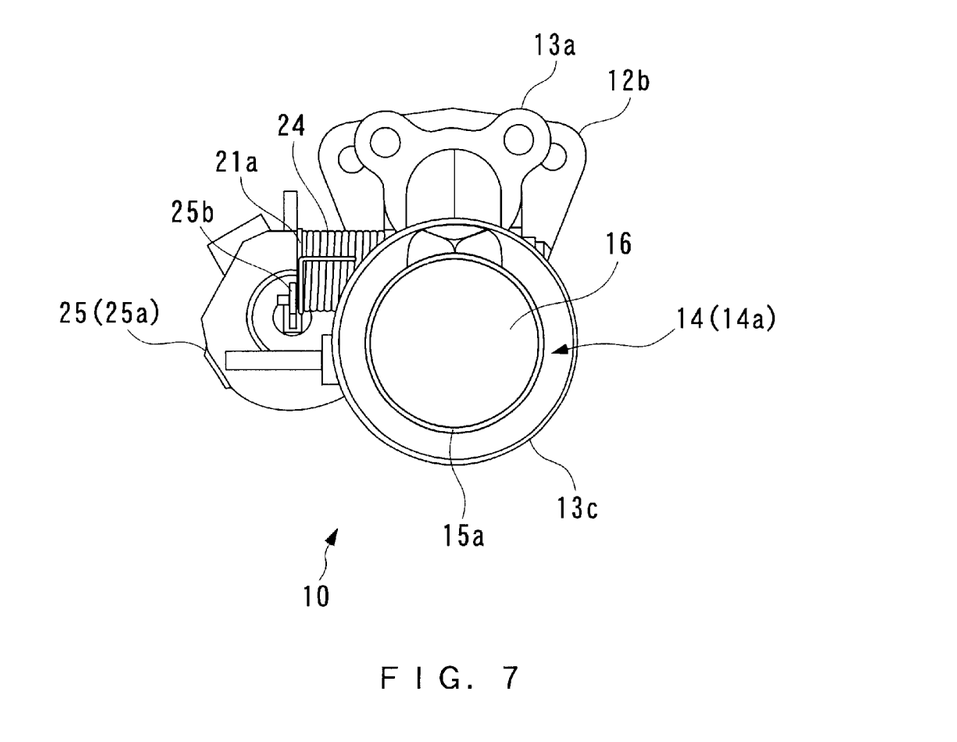
FIG. 7 is a cross-sectional view taken along a line A—A in FIG. 2.

Further, the flow path switching valve 20 comprises a pivot shaft 21 arranged in the branch case 12 for pivotal movements about a horizontal axis; a valve body 23 coupled to the pivot shaft 21 through a stay 22 of an inverted C-shaped cross-section; a twisted coil spring 24 (see FIG. 7) attached to the pivot shaft 21; and so on.

The pivot shaft 21 extends beyond the branch case 12, and a substantially discoidal pivot plate 21a is concentrically fixed at one end of the pivot shaft 21 protruding outward from the branch case 12. The twisted coil spring 24 has one end attached to the pivot plate 21a and the other end to the branch case 21.

Figure 9:
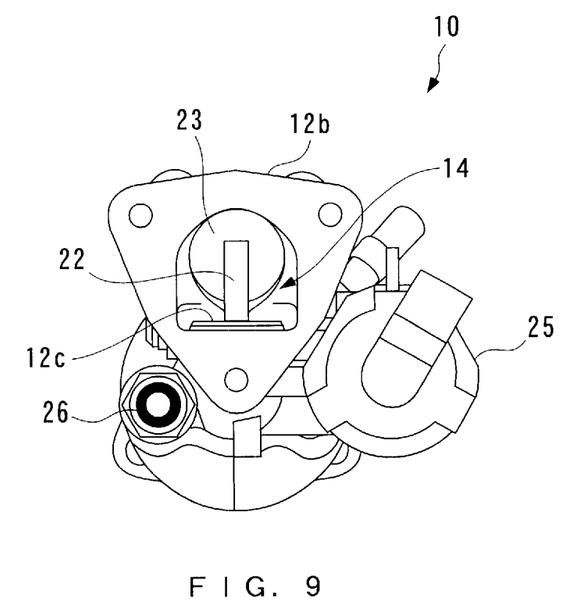
FIG. 9 is a front view illustrating the HC adsorbent of the exhaust gas purifying apparatus.

As illustrated in FIG. 9, the valve body 23 is formed in a disk shape, and is arranged at a location at which the bypass exhaust passage 15 is branched off the main exhaust passage 14 in the branch case 12. The bypass exhaust passage 15 has a circular opening at the branched location, the edge of which is formed flat to serve as a first valve seat 12c of the valve body 23. At a location downstream of the branch of the main exhaust passage 14 with the bypass exhaust passage 15, the main exhaust passage 14 is formed with a step portion of a circular cross-section having a smaller diameter, which serves as a second valve sheet 12d of the valve body 23.

Figure 4:
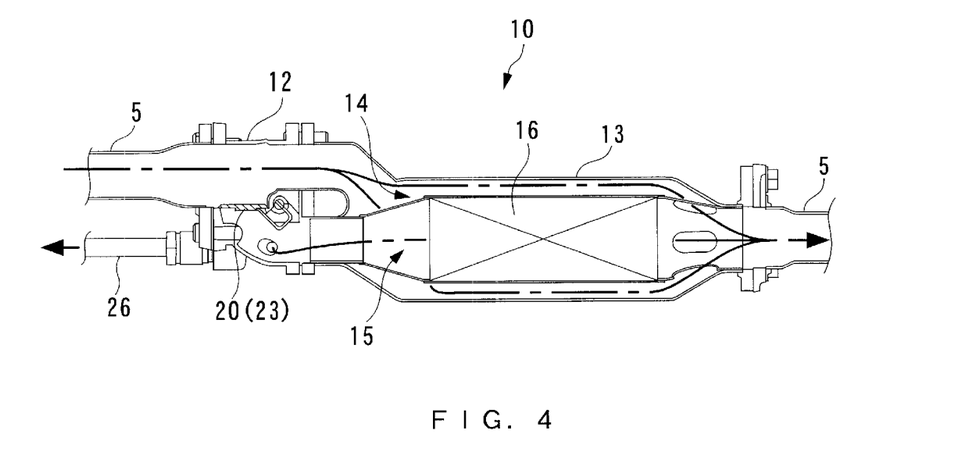
FIG. 4 is a diagram illustrating a state in which an exhaust gas flow path is switched to a main exhaust passage.
Figure 5:
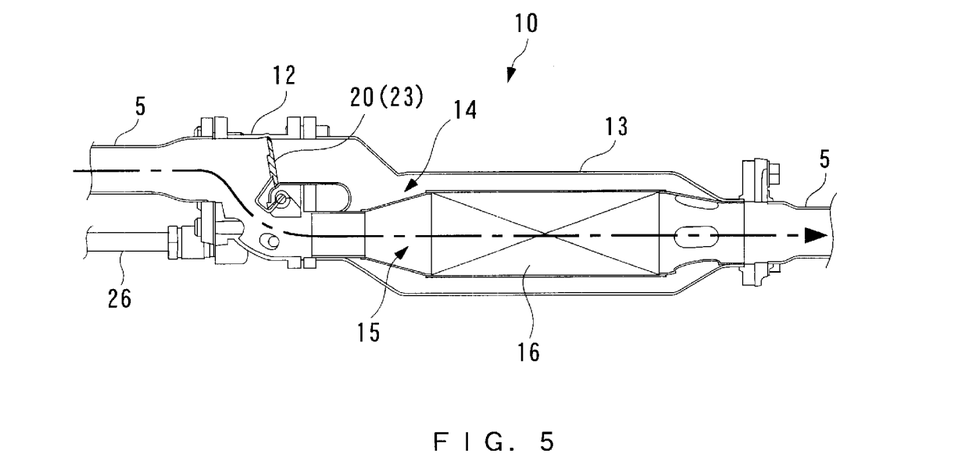
FIG. 5 is a diagram illustrating a state in which the exhaust gas flow path is switched to a bypass exhaust passage.

The valve body 23 is arranged for pivotal movements about the pivot shaft 21 between a main position (position shown in FIG. 4) at which the valve body 23 abuts to the first valve seat 12c to close the bypass exhaust passage 15 and simultaneously open the main exhaust passage 14, and a bypass position (position shown in FIG. 5) at which the valve body 23 abuts to the second valve sheet 12d to close the main exhaust passage 14 and simultaneously open the bypass exhaust passage 15. Also, the valve body 23 is normally urged by the twisted coil spring 24 toward the main position.

An actuator 25 is further attached to the branch case 12 for driving the flow path switching valve 20. This actuator 25, which is driven by a negative pressure supplied thereto, comprises an actuator body 25a arranged in close proximity to the outer surface of the branch case 12, and an arm 25b coupled to the pivot plate 21a. The arm 25b is held in a state (state shown in FIG. 2) in which it is most protruded from the actuator body 25a on the downstream side by the urging force of the twisted coil spring 24, when the actuator 25 is not supplied with the negative pressure, thereby holding the valve body 23 at the main position. On the other hand, as the actuator 25 is supplied with a negative pressure, the arm 25b is retracted into the actuator body 25a against the urging force of the twisted coil spring 24, thereby driving the valve body 23 from the main position to the bypass position. As long as the actuator 25 is continuously supplied with the negative pressure, the arm 25b holds the valve body 23 at the bypass position.

The actuator 25 is connected to an intake pipe 9 through a negative pressure pipeway. The negative pressure pipeway (only a portion of which is shown) is provided with an actuator driving electromagnetic valve 31 (switching means) for opening and closing the same, which is connected to an ECU 30. The ECU 30 controls opening/closing of the actuator driving electromagnetic valve 31 to supply or not the actuator 25 with a negative pressure in the intake pipe 9, thereby causing the actuator 25 to switch the flow path switching valve 20 as described above.

An EGR pipe 26 has one end connected to the bypass exhaust passage 15 of the branch case 12, and the other end connected to the intake pipe 9. Also, a duty control valve, not shown, is provided at an intermediate location of the EGR pipe for controlling the amount of exhaust gases (EGR amount) circulated to the intake system under the control of ECU 30.

The junction case 13, on the other hand, comprises a larger cylinder 13c having the bypass exhaust passage 15 formed concentrically therewith, and a smaller cylinder 13d connected to an upstream end of the larger cylinder 13c. The larger cylinder 13c, in a cylindrical shape, has tapered upstream and downstream ends. The bypass exhaust passage 15 has a wall 15a made of a highly thermally conductive metal (for example, stainless steel), and is similar to the larger cylinder 13c in that it is cylindrical and its upstream and downstream ends are tapered. Further, the entire peripheries of the upstream and downstream ends of the wall 15a of the bypass exhaust passage 15 are connected to the inner face of the junction case 13 in an air tight state. The bypass exhaust passage 15 is also formed in a downstream portion of the wall 15a with five oval throughholes 15b at equal intervals in the circumferential direction.

The bypass exhaust passage 15 in the junction case 13 is continuous to the bypass exhaust passage 15 of the branch case 12 and the exhaust pipe 5 on the downstream side. The main exhaust passage 14 in the junction case 13, on the other hand, extends through the smaller cylinder 13d and the larger cylinder 13c, with its upstream end continuous to the main exhaust passage 14 of the branch case 12 and its downstream end joined to the downstream end of the bypass exhaust passage 15 through the throughholes 15b.

Figure 6:
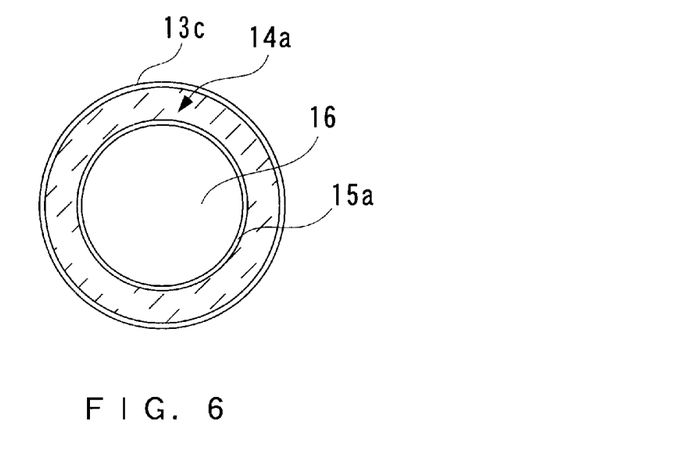
FIG. 6 is a cross-sectional view of a larger cylinder which forms part of an HC adsorbent of the exhaust gas purifying apparatus.

The main exhaust passage 14 also comprises a flow-in passage 14b extending into the smaller cylinder 13d, and a troidal passage 14a continuous to the flow-in passage 14b and completely surrounding the bypass exhaust passage 15. The flow-in passage 14b is circular in cross section, is a location at which a flow path area of the exhaust system 3 is minimum, and has a predetermined cross-sectional area S1. The troidal passage 14a defines a space of troidal cross section (space indicated by broken lines in FIG. 6) formed between the larger cylinder 13c and the wall 15a of the bypass exhaust passage 15, and has a predetermined cross-sectional area S2. The ratio S2/S1 of the cross-sectional area S2 to the cross-sectional area S1 is set to about 2.0 by a reason set forth below.

The HC adsorbent 16 is filled in the entire cross section of the bypass exhaust passage 15 except for the upstream and downstream ends. The HC adsorbent 16 is comprised of a honeycomb core (not shown), made of a metal (for example, stainless steel), which carries zeolite on its surface, and comprises a multiplicity of inner holes (not shown) which extend through the bypass exhaust passage 15. Then, as exhaust gases introduced into the bypass exhaust passage 15 pass through the inner holes, hydrocarbons and moisture in the exhaust gases are adsorbed by the zeolite in the HC adsorbent 16.

Zeolite, which has high heat resistant properties, adsorbs hydrocarbons (unburnt components) when its temperature is below a predetermined desorption starting temperature (for example, below 100° C.), begins desorbing hydrocarbons once adsorbed thereby when its temperature rises to the desorption starting temperature or higher, and completely desorbs the adsorbed hydrocarbons when its temperature rises to a predetermined full desorption temperature TREF (for example, 200° C). Then, the hydrocarbons desorbed from the zeolite are recirculated to the intake system through an EGR pipe 26 and burnt by the engine 2. It should be noted that the zeolite is only required to have the ability of adsorbing hydrocarbons and is not particularly limited in the type. This embodiment employs a mixture of USY (Y-type), Ga-MFI and ferrierite.

Figure 8:
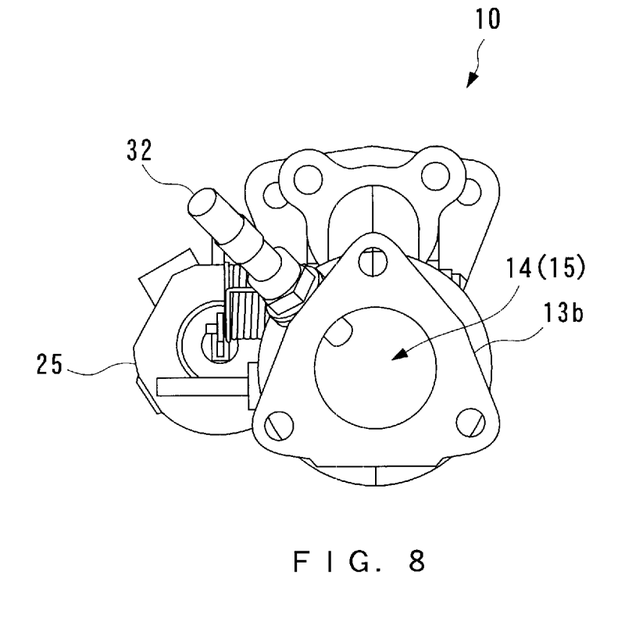
FIG. 8 is a cross-sectional view taken along a line B—B in FIG. 2.

Further, as illustrated in FIGS. 2 and 8, a humidity sensor 32 is attached to a downstream end portion of the junction case 13. The humidity sensor 32 detects humidity in exhaust gases passing through the HC adsorbent 16, and sends a signal indicative of detected humidity to the ECU 30. This detection signal is used by the ECU 30 to determine whether the HC adsorbent 16 has been degraded.

The ECU 30 (switching means) is based on a microcomputer which comprises an I/O interface, a CPU, a RAM and a ROM. Detection signals from a variety of sensors (not shown) such as the humidity sensor 32 undergo A/D conversion and waveform shaping in the I/O interface before they are inputted to the CPU. The CPU determines an operating state of the engine 2 with reference to the detection signals from the variety of sensors in accordance with a control program or the like stored in the ROM, and controls a switching operation of the flow path switching valve 20 in accordance with the determined operating state in a manner described below.

Specifically, when the temperature of the three-way catalysts 7 is still low immediately after starting the engine 2 so that the three-way catalysts are in an inactivated state, a negative pressure in the intake pipe 9 is supplied to the actuator 25 through the actuator driving electromagnetic valve 31. This causes the actuator 25 to switch the flow path switching valve 20 from the main position to the bypass position against an urging force of the twisted coil spring 24 to close the main exhaust passage 14 in the case 11 and simultaneously open the bypass exhaust passage 15. As a result, exhaust gases pass through the HC adsorbent 16 and emitted in the atmosphere (see FIG. 5). In this event, hydrocarbons in the exhaust gases are adsorbed by the HC adsorbent 16.

At the time the predetermined time period t1 has been elapsed after the start of the engine 2, the negative pressure supplied to the actuator 25 is stopped, and the flow path switching valve 20 is switched to the main position to close the bypass exhaust passage 15 in the case 11 and simultaneously open the main exhaust passage 14. At this time, since the three-way catalysts 7 have already started activating, the exhaust gases are subsequently purified by the catalyzer 8, and emitted in the atmosphere through the troidal passage 14a (see FIG. 4). In addition, the heat exchange occurring when the exhaust gases pass through the troidal passage 14a causes the temperature of the HC adsorbent 16 to rise to the aforementioned desorption starting temperature or higher, so that hydrocarbons adsorbed on the HC adsorbent 16 start desorption. Further, as the temperature of the HC adsorbent 16 rises to the full desorption temperature TREF or higher, the hydrocarbons are fully desorbed from the HC adsorbent 16.

In this event, the EGR operation is not performed until the operating state of the engine 2 is stabilized, so that the EGR pipe 26 is maintained in a closed state. Also, since exhaust gases passing through the troidal passage 14a and the throughholes 15b have a pressure so high that hydrocarbons desorbed from the HC adsorbent 16 are not emitted in the atmosphere but remains in the bypass exhaust passage 15. Then, the EGR operation is performed after the operating state of the engine 2 has been stabilized, so that the desorbed hydrocarbons are recirculated to the intake pipe 9 through the EGR pipe 26, and burnt by the engine 2. It should be noted that as the EGR operation is performed, high temperature exhaust gases flow through the HC adsorbent 16, causing the temperature of the HC adsorbent 16 to further rise.

Figure 10:
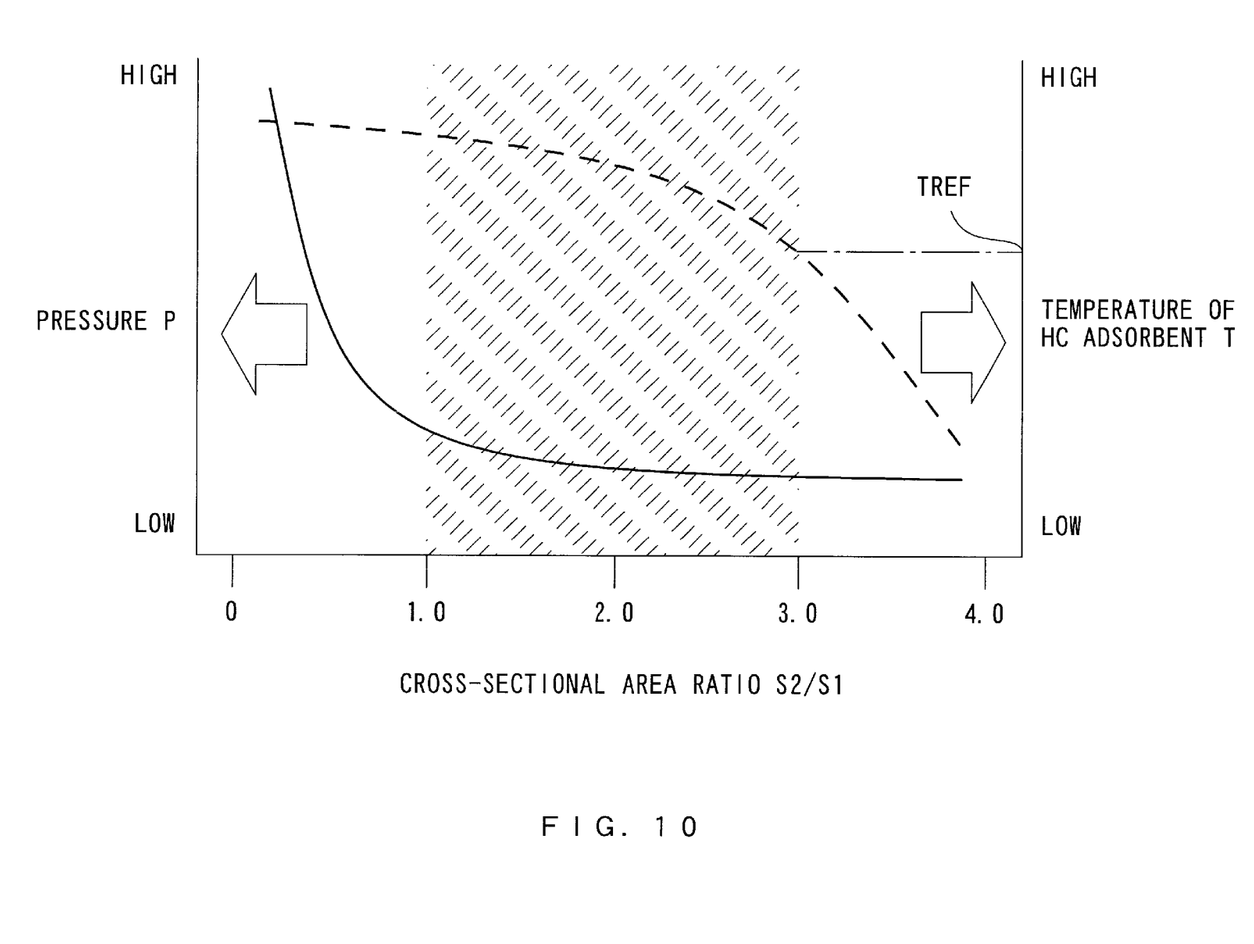
FIG. 10 is a graph showing an exemplary relationship of the pressure in the exhaust pipe and the temperature of the HC adsorbent to a cross-sectional area ratio S2/S1.
Figures 11A, 11D:
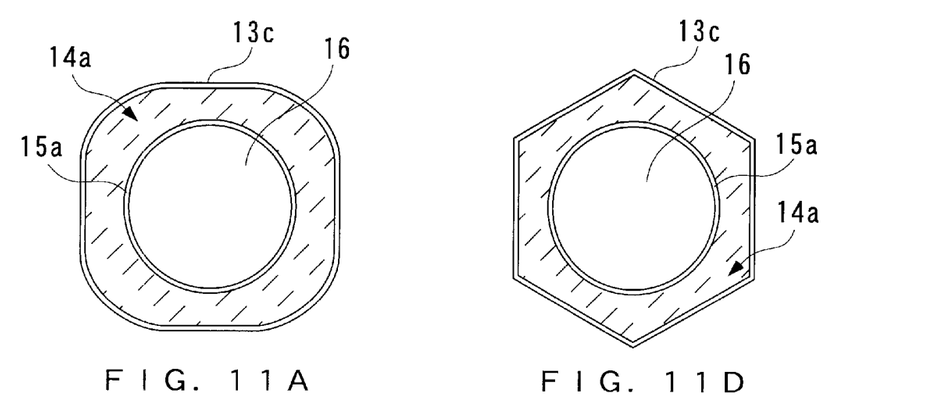
FIGS. 11A–11E are cross-sectional views illustrating exemplary cross-sectional shapes for a troidal passage of the HC adsorbent.
Figures 11B, 11E:
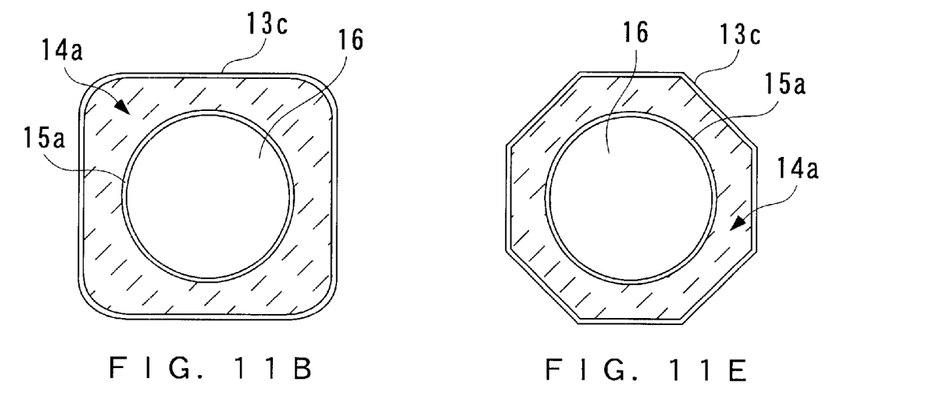
Figure 11C:
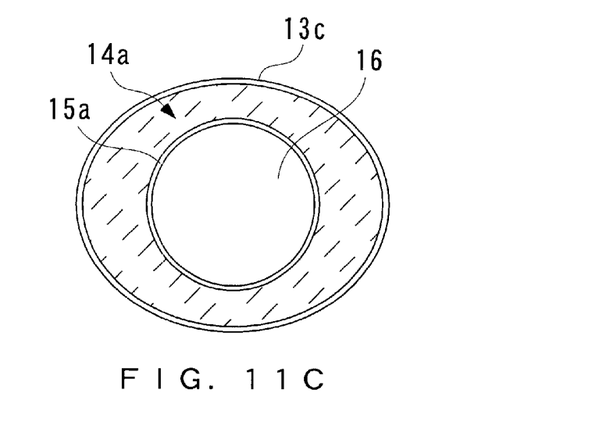

Next, a relationship between a temperature T eventually reached by the HC adsorbent 16 (hereinafter called the "eventual temperature T") and the pressure P of exhaust gases in the troidal passage 14a, while the exhaust gases are passing through the troidal passage 14a, will be described with reference to FIG. 10. FIG. 10 illustrates a relationship between the aforementioned ratio S2/S1 of the cross-sectional area S2 of the troidal passage 14a to the cross-sectional area S1 of the flow-in passage 14b, and the measured eventual temperature T of the HC adsorbent 16 and the pressure P of the exhaust gases, when the engine 2 is operated in a predetermined operating state (in a steady state with a relatively high load).

As illustrated in FIG. 10, the eventual temperature T becomes lower as the ratio S2/S1 is larger. The reason for this phenomenon is discussed below. As the cross-sectional area S2 of the troidal passage 14a is larger, the surface area of the larger cylinder 13c is larger to make the heat of the exhaust gases more susceptible to dissipating to the outside of the troidal passage 14a, and the exhaust gases are in contact with the wall 15a of the bypass exhaust passage 15 in a lower proportion to reduce the efficiency of the heat exchange between the exhaust gases and the wall 15a, thereby resulting in difficulties in raising the temperature of the HC adsorbent 16. Also, the eventual temperature T rises to the aforementioned full desorption temperature TREF or higher when the cross-sectional area ratio S2/S1 is about 3.0 or less.

On the other hand, the pressure P becomes lower as the ratio S2/S1 is larger. This is because the exhaust resistance becomes smaller as the cross-sectional area S2 of the troidal passage 14a is larger. Also, the pressure P suddenly increases as the ratio S2/S1 decreases in a region in which the ratio S2/S1 is below about 1.0, and gradually decreases as the ratio S2/S1 increases in a region in which the ratio S2/S1 is about 1.0 or more.

It is therefore appreciated from the foregoing that when the ratio S2/S is set in a range of value from 1.0 to 3.0, the eventual temperature T of the HC adsorbent 16 can be increased to the full desorption temperature TREF or higher without fail by passing exhaust gases through the troidal passage 14a after starting the engine 2, thereby making it possible to fully recover the adsorbing capability of the HC adsorbent 16 and limit an increase in the exhaust resistance. In other words, these advantages can be provided simultaneously. For the reason set forth above, the ratio S2/S1 is set to about 2.0 in this embodiment.

Figure 12A:
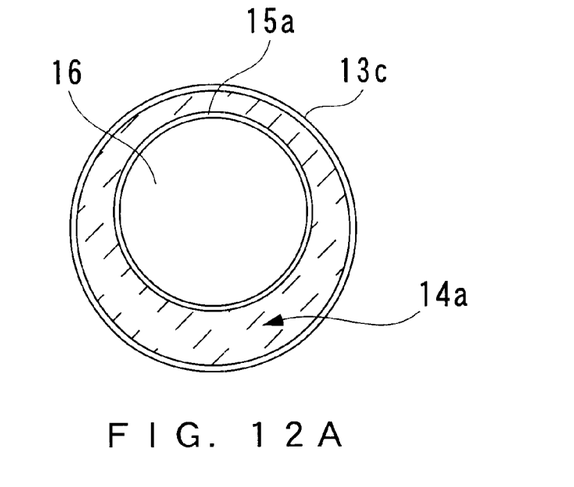
FIGS. 12A and 12B are cross-sectional views illustrating other exemplary cross-sectional shapes for the troidal passage of the HC adsorbent.
Figure 12B:
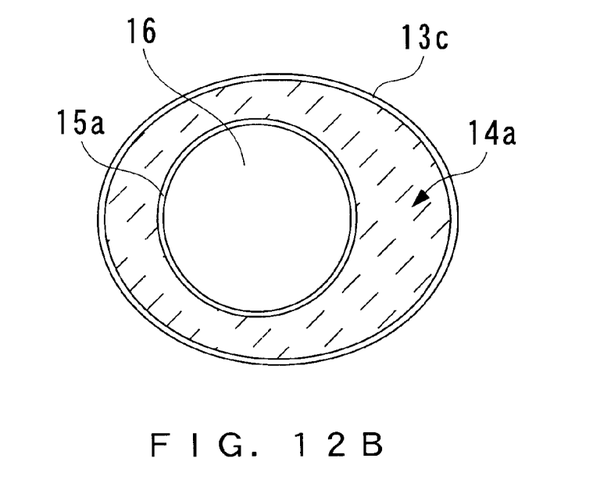

It should be noted that the cross-sectional shape of the troidal passage 14a is not limited to be troidal as in the embodiment, but may be arbitrarily selected as long as it surrounds the bypass exhaust passage 15, and the ratio S2/S1 of the cross-sectional area S2 of the troidal passage 14a to the cross-sectional area S1 of the flow-in passage 15b can be set in a range similar to the above, and advantages similar to the above can be provided. For example, as illustrated in FIGS. 11A–11E, the cross-sectional shape of the junction case 13 may be selected from a rounded rectangle, oval, regular hexagon, regular octagon, and so on (portions indicated by broken lines in the figures represent the troidal passage 14a having the cross-sectional area S2). Further, while the cylinder 13a of the junction case 13 and the bypass exhaust passage 15 are arranged concentrically with each other, they may be arranged eccentrically with each other, as illustrated in FIGS. 12A, 12B (portion indicated by broken lines represent the troidal passage 14a having the cross-sectional area S2). With such an arrangement, when exhaust gases flows into the troidal passage 14a in a non-uniform state due to some reasons associated with the angle and arrangement of the flow-in passage 14b, they may be biased to solve this to provide a uniform flow of exhaust gases, thereby making it possible to eliminate variations in temperature rise of the HC adsorbent 16.

Also, the switching of the exhaust gas flow path by means of the flow path switching valve 20 is not limited to the approach employed in the embodiment which is performed based on the lapse of time after the start of the engine 2, but may be performed in accordance with another parameter indicative of an operating state of the engine 2. For example, the switching may be performed in accordance with a cooling water temperature of the engine 2, temperature of the three-way catalysts 7, temperature of the HC adsorbent 16, or the like, detected by a temperature sensor, or may be performed in accordance with parameters representative of these temperatures. Further, the flow path switching valve 20 may be controlled such that the exhaust gas flow path is switched to the main exhaust passage 14 only when hydrocarbons are desorbed from the HC adsorbent 16 while the EGR operation is performed, and normally to the bypass exhaust passage 15. Furthermore, while the foregoing embodiment employs the flow-in passage 14b as a predetermined location for comparison of the passage cross-sectional area with the troidal passage 14a, another location of the exhaust pipe 5 having the minimum passage cross-sectional area between the exhaust manifold 4 and the troidal passage 14a may be employed instead. Alternatively, a predetermined location having an area slightly larger than the minimum passage cross section may be employed, in which case the ratio of the cross-sectional areas may be set to a value in accordance with the cross-sectional area of an employed location to provide similar advantages.

As will be appreciated from the foregoing description, according to the exhaust gas purifying apparatus for an internal combustion engine of the present invention, it is possible to simultaneously realize sufficient recovery of the adsorbing capability of the adsorbent and limitation to an increase in the exhaust resistance.

What is claimed is:

1. An exhaust gas purifying apparatus for an internal combustion engine, arranged in an exhaust system having a first exhaust passage connected to said internal combustion engine and a second exhaust passage having one end branched off said first exhaust passage and the other end joined to said first exhaust passage, for purifying exhaust gases discharged from said internal combustion engine, comprising:

switching means for switching an exhaust gas flow path to one of said second exhaust passage and said first exhaust passage in accordance with an operating state of said internal combustion engine;

a catalyst for purifying exhaust gases in said exhaust system; and an adsorbent arranged in said second exhaust passage for adsorbing unburnt components in the exhaust gases supplied to said second exhaust passage through said switching means, and for desorbing the adsorbed unburnt components when said adsorbent is heated to a predetermined temperature or higher, wherein said second exhaust passage is arranged in said first exhaust passage;

said first exhaust passage includes a troidal passage which completely surrounds a portion of said second exhaust passage in which said adsorbent is arranged; and a ratio of a cross-sectional area of said troidal passage to a cross-sectional area of a passage at a predetermined location of said exhaust system except for said troidal passage is set to a value in a range from a first predetermined value at which an exhaust resistance starts gradually decreasing as said ratio becomes higher to a second predetermined value at which the temperature of said adsorbent can rise to said predetermined temperature or higher, with the exhaust gas flow path being switched to said first exhaust passage by said switching means.

2. An exhaust gas purifying apparatus for an internal combustion engine according to claim 1, wherein:

said predetermined location of said exhaust system is downstream of a portion from which said second exhaust passage is branched off said first exhaust passage and upstream of said troidal passage;

said first predetermined value is set to 1.0; and said second predetermined value is set to 3.0.

* * * * *